United States Patent [19]

Pinson

[11] Patent Number: 5,031,995
[45] Date of Patent: Jul. 16, 1991

[54] COMPOSITE REINFORCED FIBER FOR HIGH G LOADS

[75] Inventor: George T. Pinson, Huntsville, Ala.

[73] Assignee: The Boeing Company, Seattle, Wash.

[21] Appl. No.: 454,717

[22] Filed: Dec. 21, 1989

[51] Int. Cl.$^5$ .............................................. G02B 6/44
[52] U.S. Cl. .............................. 350/96.23; 350/96.29
[58] Field of Search ............. 350/96.15, 96.23, 96.29, 350/96.30, 96.33

[56] References Cited

U.S. PATENT DOCUMENTS

| | | | |
|---|---|---|---|
| Re. 28,961 | 9/1976 | Tsukamoto et al. | 29/624 |
| 3,562,899 | 2/1971 | Stout et al. | 29/474.1 |
| 4,270,963 | 6/1981 | Howatt | 156/201 |
| 4,396,446 | 8/1983 | Franken | 156/161 |
| 4,407,065 | 10/1983 | Gray | 29/820 |
| 4,432,605 | 2/1984 | Niiro et al. | 350/96.23 |
| 4,679,898 | 7/1987 | Grooten | 350/96.23 |
| 4,725,122 | 2/1988 | Anelli et al. | 350/96.23 |
| 4,737,012 | 4/1988 | Murakami et al. | 350/96.23 |
| 4,756,596 | 7/1988 | Ona et al. | 350/96.23 |
| 4,767,182 | 8/1988 | Parfree et al. | 350/96.23 |
| 4,822,133 | 4/1989 | Peacock | 350/96.23 |
| 4,886,562 | 12/1989 | Pinson | 156/172 |

FOREIGN PATENT DOCUMENTS

| | | | |
|---|---|---|---|
| 2902576 | 7/1980 | Fed. Rep. of Germany | 350/96.23 |
| 57-11304 | 1/1982 | Japan . | |
| 57-104103 | 6/1982 | Japan . | |
| 57-191604 | 11/1982 | Japan . | |
| 58-14803 | 1/1983 | Japan . | |
| 736018 | 8/1955 | United Kingdom . | |
| 1588399 | 4/1981 | United Kingdom . | |

Primary Examiner—John D. Lee
Assistant Examiner—Stephen W. Barns
Attorney, Agent, or Firm—Finnegan, Henderson, Farabow, Garrett & Dunner

[57] ABSTRACT

A reinforced optical fiber including a single optically guiding fiber, a nonmetallic intermediate layer of flexible strength members conforming to the fiber and tapering at a pre-determined rate to expose the fiber, and a metal sheath around the fiber and intermediate layer conforming to the intermediate layer and terminating prior to the taper of the intermediatae layer. A method of manufacturing the fiber sheathed in a metal casing including the steps of separately feeding the optical fiber surrounded by the intermediate layer and the casing material into a die, and drawing the encased fiber from the die. The method also includes measuring and adjusting the tensions of the fiber, casing material, and encased fiber. A die for sheathing the optical fiber includes a die block, an entrance for the fiber and casing material, a continuous and smooth shaping chamber, and an exit for the encased fiber.

3 Claims, 3 Drawing Sheets

COMPOSITE REINFORCED FIBER FOR HIGH G LOADS

BACKGROUND OF THE INVENTION

1. Field of the Invention

The invention relates to a composite reinforced fiber for high G loads and more particularly to an optical fiber reinforced with a woven intermediate layer covered by a metal sheathing.

2. Description of Related Art

The invention defines a reinforced optical fiber particularly suited for battlefield use with a mortar or cannon fired projectile. Such a battlefield system is described in U.S. Pat. No. 4,770,370 to Pinson.

Although reinforced coatings for optical fibers are known, none are currently available that possess the necessary strength and flexibility that permit the fiber to be used in a mortar or cannon launched munition and survive the handling and environment associated with an active battlefield. Special fiber attributes are required for (1) the fiber extending from the mortar to the projectile controller, (2) the fiber extending from the mortar to the fiber pay-out bobbin, and (3) the transition between reinforced fiber and unreinforced fiber wound on the bobbin.

The method for the fabrication of the reinforced fiber that will be used as the core for the present invention is defined in U.S. Pat. No. 4,886,562 assigned to the assignee hereof which defines the method for weaving a central strand of optical fiber in a woven or plaited coating of glass or other suitable high strength flexible material.

It has been found that in the vicinity of the mortar, two types of damaging environments exist. The first is human induced. In this case, the soldier is in a life threatening situation where optical fibers are strewn on the ground. The fiber may be stepped on, pulled, bent or otherwise manhandled. The second damaging environment is caused by the high G loads created during launch. In these environments, it has been found that a metal reinforced fiber is desirable for protection.

Metal sheathed optical fiber is known in the telecommunication field as described in U.S. Pat. Nos. 4,361,381 to Williams and 4,396,446 to Franken. However, the prior art of metal sheathing of optical fiber does not provide metal sheathing which is suitable for the above-described environment.

Methods of sheathing a metal wire in metal casing are known in the art as shown in U.S. Pat. No. Re. 28,961 to Tsukamoto. However, these methods do not provide for the control of tension on the optical fiber that is provided by the present invention. Additionally, U.S. Pat. No. 4,270,963 to Howet discloses an apparatus for wrapping metal foil around an optical fiber, but does not provide the smooth progressive curling and shaping of the present invention.

SUMMARY OF THE INVENTION

It is an object of the present invention to provide an optical fiber capable of being used in a projectile system, and provide the method and apparatus for the manufacture of that optical fiber. Other objects and advantages of the invention will be set forth in part in the description which follows.

This invention provides an optical fiber sheathed in a metal casing which closely conforms to the size of the optical fiber and terminates prior to the end of the fiber. Both of these features are important to an optical fiber used in a projectile system because a small diameter is needed to allow the sheathed fiber to be placed in a groove formed in the projectile body. Additionally, the transition to unreinforced fiber is necessary because the bare optical fiber is flexible and may be compactly wound on a bobbin and then later payed out as the projectile flies.

The invention also describes a method for fabricating the sheathed fiber which provides for tension control during the process and describes a die which smoothly and continuously shapes the metal sheathing around the optical fiber.

In accordance with the purposes of the invention, as embodied and broadly described herein, a reinforced optical fiber comprises a single optically guiding fiber, a nonmetallic intermediate layer surrounding the optical fiber for reinforcing in bending and tension wherein the intermediate layer conforms to the shape and size of the fiber and tapers at a predetermined rate to expose the optical fiber at the end of a transition region, and a metal sheath for reinforcing impact and tensile strength around the optical fiber wherein the metal sheath conforms in shape and size to the outer dimensions of the optical fiber surrounded by the intermediate layer and the metal sheath terminates prior to the taper of the intermediate layer. In accordance with the present embodiment, the bare optical fiber is wound on a bobbin for later pay-out.

In accordance with the purposes of the invention, as embodied and broadly described herein, the method for the manufacture of an optical fiber sheathed in a metal casing comprises the steps of separately feeding the optical fiber surrounded by the intermediate layer and the casing material into the first side of a die, drawing the optical fiber encased in the casing material from the second side of the die, measuring the tension on the optical fiber, the casing material and the sheathed fiber being drawn from the die, and individually adjusting those tensions. In accordance with the present embodiment, the method includes shaping and closely conforming the casing around the optical fiber by drawing the material through the die and then sealing the casing material around the optical fiber. The preferred method further includes guiding the optical fiber and casing material into the die so that the fiber is centered on the casing material.

In accordance with the purposes of the invention, as embodied and broadly described herein, the die for sheathing an optical fiber in metal casing material comprises a die block, an entrance in the die block for the optical fiber and the casing material, means for continuously and smoothly contouring the casing material so that the material is conformingly wrapped around the optical fiber, and an exit in the die block through which the optical fiber encased in the casing material exits. In accordance with the preferred embodiment, the die includes guiding means for the optical fiber and supporting means for the casing material attached to the die block.

The objects and advantages of the invention may be realized and attained by means of the instrumentalities and combinations particularly pointed out in the appended claims.

BRIEF DESCRIPTION OF THE DRAWINGS

Further features and advantages of the present invention will become apparent from the following detailed description, taken together with the drawing in which.

DESCRIPTION OF THE PREFERRED EMBODIMENT

Figure 1:
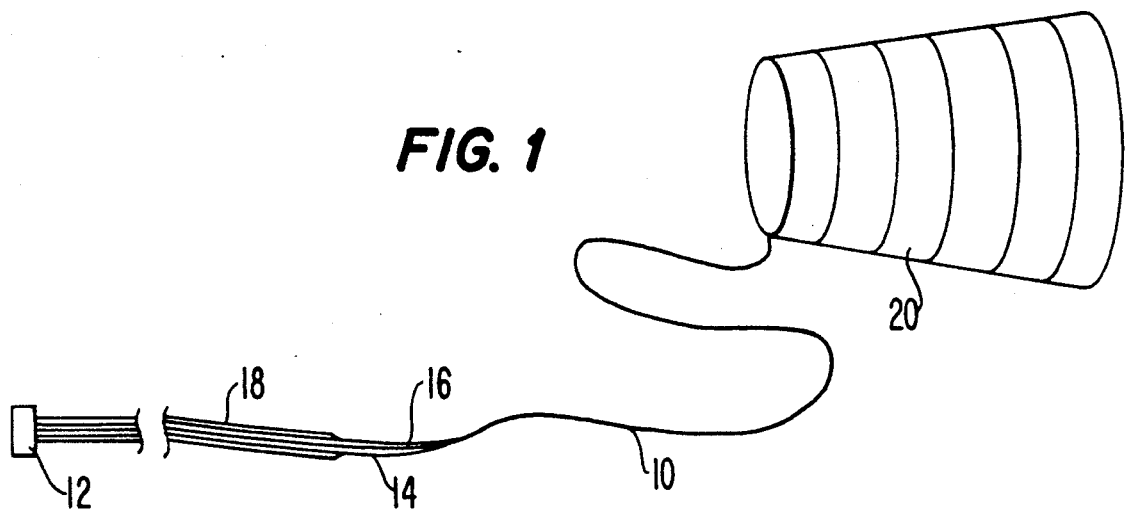
FIG. 1 depicts the composite reinforced optical fiber of the subject invention partially wound on a bobbin.

Reference will now be made to the presently preferred embodiment of the invention which is illustrated in the drawings.

The subject invention relates to a composite reinforced fiber for high G load situations such as the launch of a fiber optically guided mortar. The invention also relates to the process and apparatus for manufacturing the composite reinforced optical fiber.

Figure 2:
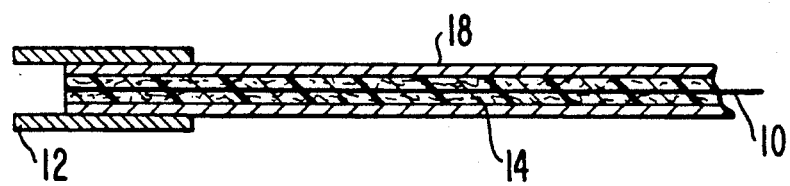
FIG. 2 is a cross-sectional view of the composite reinforced optical fiber.

The composite optical fiber will now be discussed with reference to FIGS. 1 and 2.

In accordance with the present invention, the reinforced optical fiber comprises a single optical fiber having defined outer dimensions within which optical guiding occurs. As embodied herein, optical fiber 10 is an optically guiding fiber as known in the art. Fiber 10 is approximately 125-250 microns in diameter. Optical fiber 10 preferably includes connection 12 for connecting to a projectile controller (not shown).

In accordance with the present invention, the reinforced optical fiber further comprises a nonmetallic intermediate layer containing flexible strength members for reinforcing in tension and bending around said optical fiber wherein th intermediate layer 14 initially conforms in shape and size to the outer dimensions of the metal sheath 18 and the intermediate layer tapers at a predetermined rate to expose the optical fiber where that optical fiber is flexible and can be stored for later pay-out. As embodied herein, intermediate layer 14 is preferably made of glass or "KEVLAR" (trade name, manufactured by DuPont) fibers in a flexible matrix. A method of manufacturing the intermediate layer is disclosed in U.S. Pat. No. 4,886,562 assigned to the assignee hereof. Preferably, intermediate layer 14 includes taper 16 to prevent stress concentration when bending the fiber. Taper 16 of intermediate layer 14 is preferably located after the portion of the fiber subject to high G loads. Prior to taper 16 intermediate layer 14 has a constant diameter of approximately 1 mm.

In accordance with the present invention, the reinforced optical fiber further comprises a metal sheath for reinforcing the fiber for impact and tensile strength around the optical fiber wherein the metal sheath conforms in shape and size to the outer dimensions of the optical fiber surrounded by the intermediate layer and the metal sheath terminates prior to the taper of the intermediate layer. As embodied herein, intermediate layer 14 is surrounded by metal sheath 18. Sheath 18 is preferably a solid metal foil such as steel or brass. Alternatively, sheath 18 is a woven metal shell.

A further portion of the preferred embodiment includes bare optical fiber 10 wound on bobbin 20. U.S. Pat. No. 4,746,080 to Pinson discloses the preferred method of winding fiber 10 on bobbin 20.

Figure 3:
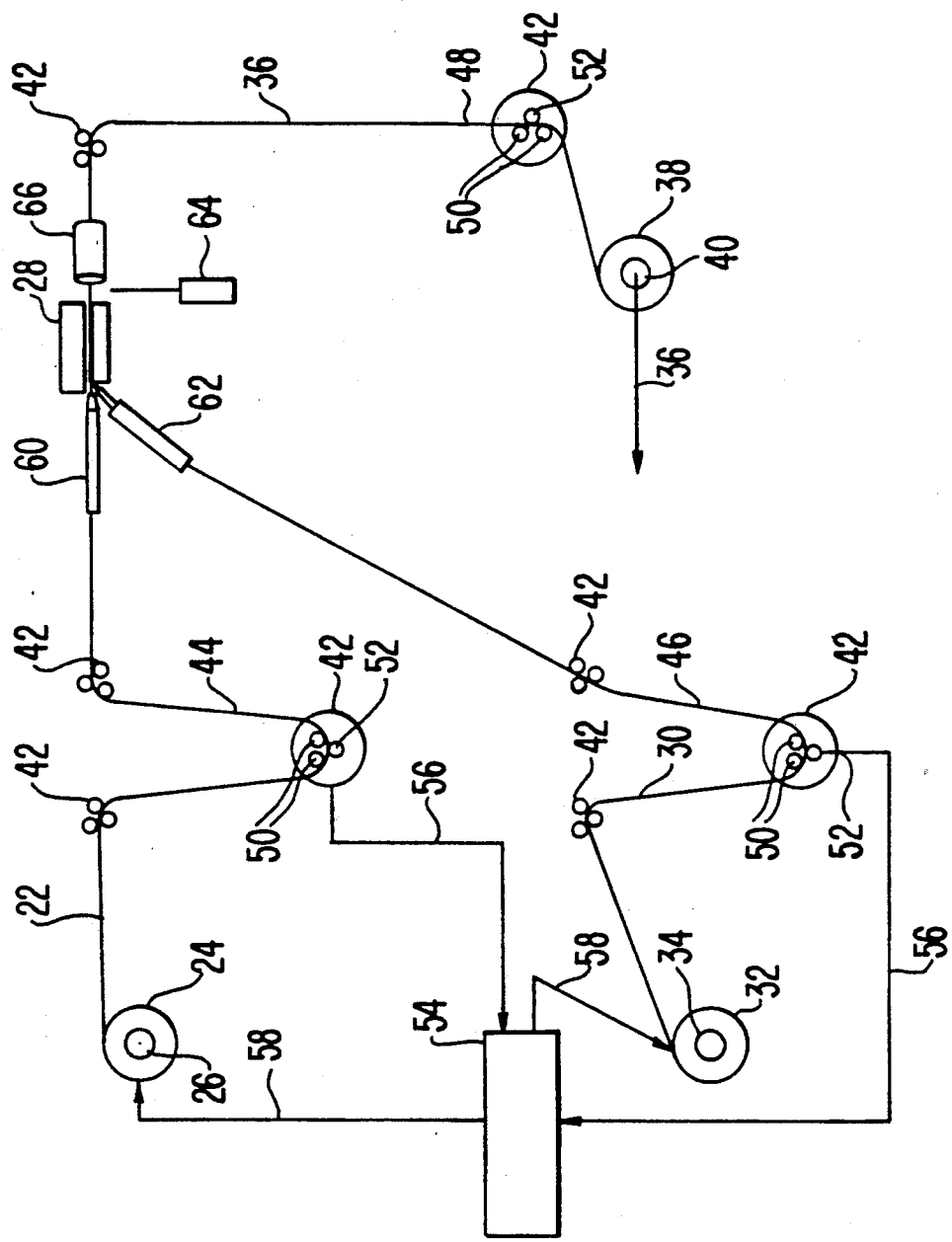
FIG. 3 is a diagrammatic representation of the arrangement and method for sheathing the optical fiber in the metal casing material.

In order to describe the method of manufacture, reference will now be made to FIG. 3.

In accordance with the present invention, the method for the manufacture of the optical fiber sheathed in a metal casing comprises the step of separately feeding the optical fiber surrounded by the intermediate layer, and the casing material into a first side of a die. As embodied herein, optical fiber and surrounding intermediate layer, together, 22 is fed by fiber pay-out reel 24 powered by motor 26 into die 28. Metal casing 30 is fed by casing pay-out reel 32 powered by motor 34 into die 28.

In accordance with the present invention, the method for the manufacture of the optical fiber sheathed in a metal casing further comprises the step of drawing the optical fiber encased in the casing material from a second side of the die. As embodied herein, the optical fiber encased in the casing material 36 is drawn from die 28 and taken up on take-up reel 38 powered by motor 40.

In accordance with the present invention, the method for the manufacture of the optical fiber sheathed in a metal casing further comprises the step of measuring a first, second and third tension on the optical fiber being fed into the first side of the die, the casing material being fed into the first side of the die, and the optical fiber being drawn from the second side of the die, respectively. As embodied herein, tensionmeters 42 measure the first tension 44 on the optical fiber 22, second tension 46 on the casing 30 and third tension 48 on the optical fiber encased in the casing material. Preferably, the tensionmeter consists of rollers 50 and a spring loaded roller 52 connected to a potentiometer that registers motion when roller 52 moves from a preset position as the tensions 44, 46 and 48 change.

Tensionmeters 42 are used to control the tension imparted by the difference between the feed rate of motor 26 and the pickup rate of motor 40. It is not desired to have metal sheathed fiber 36 with a difference in tension between fiber and intermediate layer 22 and metal casing 30. Therefore, the forces acting on fiber and intermediate layer 22 and metal sheathing 30 are to be minimized and equal tension is to be maintained throughout the forming process.

In accordance with the present invention, the method for the manufacture of the optical fiber sheathed in a metal casing further comprises the step of individually adjusting the first, second and third tensions to permit smooth movement through the die. As embodied herein, the value of first 44, second 46 and third 48 tensions are transferred to the tension controller 54 by tension transfer signals 56. Tension controller 54 individually adjusts the tensions 44, 46 and 48 by transfer of tension control signals 58 to motors 26 and 34.

Tension control is of considerable importance in the fabrication of encased fiber 36 since optical fiber 10 is sensitive to residual stresses, and cannot tolerate excessive tensional and torsional forces. Excessive tensions 44, 46 and 48 will result in stretch in encased fiber 36. Further, it is important that tension 44 and 46 into die 28 be equal so as not to leave residual stresses in encased fiber 36.

A further preferred embodiment of the method for the manufacture of an optical fiber sheathed in a metal casing includes guiding optical fiber 22 and metal casing 30 into die 28 by using guides 60 and 62 so that the optical fiber is centered on the casing material. Preferably, die 28 shapes casing material 30 around optical fiber 22 by closely conforming the casing material to the optical fiber.

A further preferred embodiment of the method for the manufacture of an optical fiber sheathed in casing material includes sealing the optical fiber encased in the casing material 36. Preferably, casing material 30 is coated with a suitable solder or thermoplastic adhesive which is melted by laser 64 and cooled by cooler 66, as shown in FIG. 3.

Figure 4:
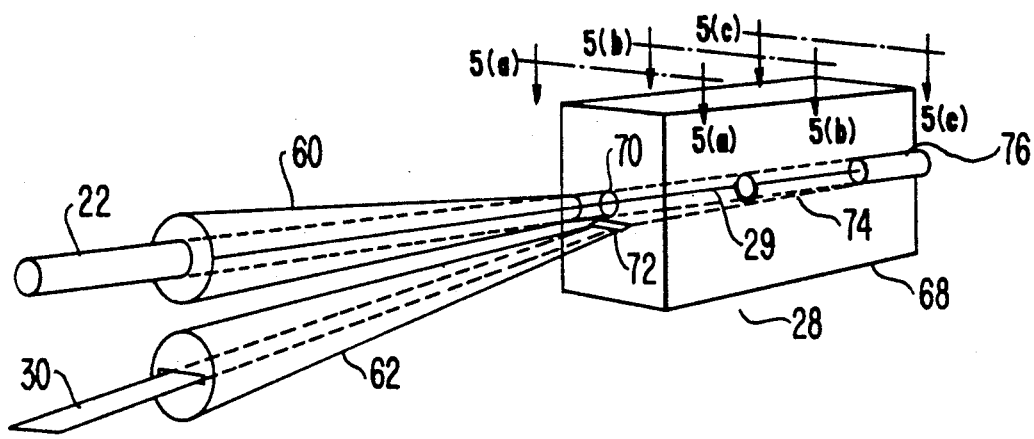
FIG. 4 is a perspective view of the die for sheathing the optical fiber in the metal casing material.
Figure 5A:
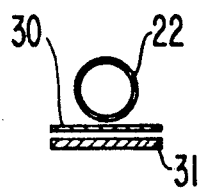
FIG. 5(a), (b) and (c) are sectional views of the optical fiber and the metal casing material as they pass through the die.
Figure 5B:
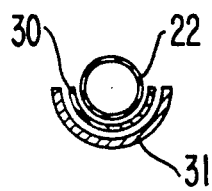
Figure 5C:
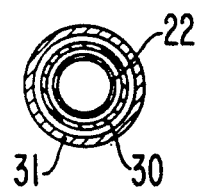
Figure 6:
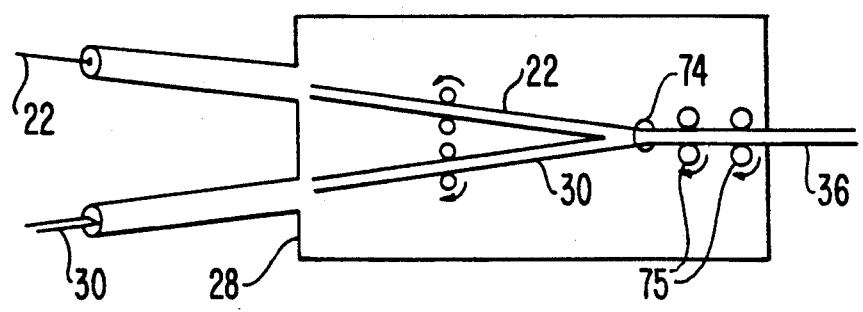
FIG. 6 is a cross-sectional view of the die with powered wheels.

Reference now will be made to FIGS. 4 through 6 in order to explain the die apparatus for sheathing the optical fiber in casing material.

In accordance with the present invention, the die for sheathing an optical fiber of indefinite length in metal casing material comprises a die block. As embodied herein, die 28 includes die block 68.

In accordance with the present invention, the die for sheathing on optical fiber of indefinite length further comprises an entrance in the die block for entry of the optical fiber and the metal casing material into the die block. As embodied herein, optical fiber entrance 70 is circular in shape and casing material entrance 72 is rectangular in shape. Die 28 is split 29 along the fiber 22 path so that after the desired metal sheathing 30 is placed on fiber 22, the fiber can be removed by opening the die. In accordance with the present invention, the die for sheathing an optical fiber of indefinite length in metal casing material further comprises means for continuously and smoothly contouring the casing material so that the casing material wraps conformingly around the optical fiber. As embodied herein, shaping chamber 74 having a "TEFLON" (tradename, manufactured by DuPont) impregnated $Al_2O_3$ surface 31 to minimize friction is formed in a continuous fashion so as to progressively curl metal casing material 30 conformingly around optical fiber 22 as shown in cross-section by FIGS. 5(a), (b) and (c) so that metal casing material 30 has an inside diameter substantially the same as the outside diameter of the fiber wrapped in the intermediate layer 22. FIGS. 5(a), (b) and (c) show gaps between fiber 22, casing 30 and surface 31 which are for illustration only.

In accordance with the present invention, the die for sheathing an optical fiber of indefinite length in metal casing material further comprises an exit in the die block through which the optical fiber sheathed in the casing material exits. As embodied herein, exit 76 is circular in shape.

A further preferred embodiment of the die for sheathing an optical fiber of indefinite length in metal casing material includes guide 60 attached to die 28 for guiding optical fiber 22 into entrance 70 and support 62 attached to die 28 for supporting casing material 30 during entry into entrance 72.

Alternatively, a die 28 providing reduced internal friction is shown in FIG. 6. One or more powered drive wheels 75 are provided to place compressional forces to permit pushing fiber 22 and metal casing 30 into shaping zone 74 and to pull the material through shaping zone 74. Wheels 75 reduce the requirement of pulling on encased fiber 36 during the forming process.

The invention provides a composite reinforced optical fiber for high G load, and a method and apparatus for the manufacture of that fiber. It will be apparent to those skilled in the art that various modifications and variations could be made to the invention without departing from the scope or spirit of the invention.

What is claimed is:

1. A reinforced optical fiber comprising:

a single optical fiber having defined outer dimensions within which optical guiding occurs;

a nonmetallic intermediate layer containing flexible strength members, for reinforcing in tension and bending, around said optical fiber wherein:

said intermediate layer conforms in shape and size to said outer dimensions of said optical fiber, and said intermediate layer tapers at a predetermined rate to expose said optical fiber wherein said optical fiber is flexible and can be stored compactly for later pay-out;

a metal sheath for reinforcing said single optical fiber and said intermediate layer for impact and tensile strength around said optical fiber wherein:

said metal sheath conforms in shape and size to said outer dimensions of said optical fiber surrounded by said intermediate layer, and said metal sheath terminates prior to said taper of said intermediate layer.

2. A reinforced optical fiber comprising:

a single optical fiber having defined outer dimensions within which optical guiding occurs;

a nonmetallic intermediate layer containing flexible strength members around said optical fiber wherein said intermediate layer conforms in shape and size to said outer dimensions of said optical fiber; and a metal sheath around said intermediate layer surrounding said optical fiber wherein said metal sheath conforms in shape and size to said outer dimensions of said optical fiber surrounded by said intermediate layer, wherein said metal sheath extends for a predetermined length of less than the entire length along said reinforced optical fiber, and wherein said intermediate layer tapers at a predetermined rate until said optical fiber is exposed, wherein said taper begins after said metal sheath terminates.

3. The reinforced optical fiber as recited in claim 2, wherein said exposed optical fiber is sufficiently flexible to be wound on a bobbin.

* * * * *